United States Patent
Parola

[15] 3,693,659
[45] Sept. 26, 1972

[54] SILENT OPERATING VALVE
[72] Inventor: Gary D. Parola, Lafayette, Calif.
[73] Assignee: Grove Valve and Regulator Company, Oakland, Calif.
[22] Filed: Feb. 8, 1971
[21] Appl. No.: 113,370

[52] U.S. Cl. ............137/625.3, 137/625.38, 251/368
[51] Int. Cl. ..............................F16k 3/32, F16k 47/14
[58] Field of Search.........137/625.3, 625.38, 625.37, 137/625.28; 138/43; 251/368

[56] References Cited

UNITED STATES PATENTS

| 3,042,078 | 7/1962 | Rosell | 137/625.3 |
| 2,887,129 | 5/1959 | Stear | 138/43 |
| 3,157,200 | 11/1964 | Rowan | 137/625.33 |
| 2,576,610 | 11/1951 | Kunzog | 138/41 |
| 2,857,927 | 10/1958 | Pardee | 138/43 X |

Primary Examiner—Arnold Rosenthal
Attorney—Melvin R. Stidham

[57] ABSTRACT

A silent valve with an axially operated valve closure plug, operating against axial inlet flow. An outlet passage is disposed radially outward of the closure plug, and intermediate it and the closure plug is an annular member of porous material. The plug is guided in a sleeve disposed intermediate it and the annular member. A plurality of through openings around and along the guide sleeve are covered progressively as the closure plug moves toward open position.

5 Claims, 3 Drawing Figures

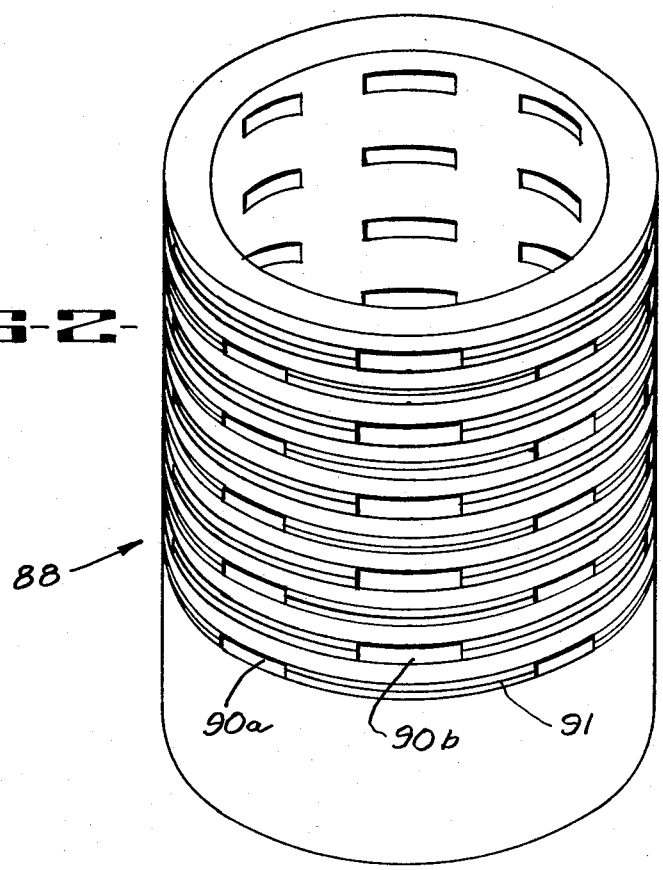
FIG-2-
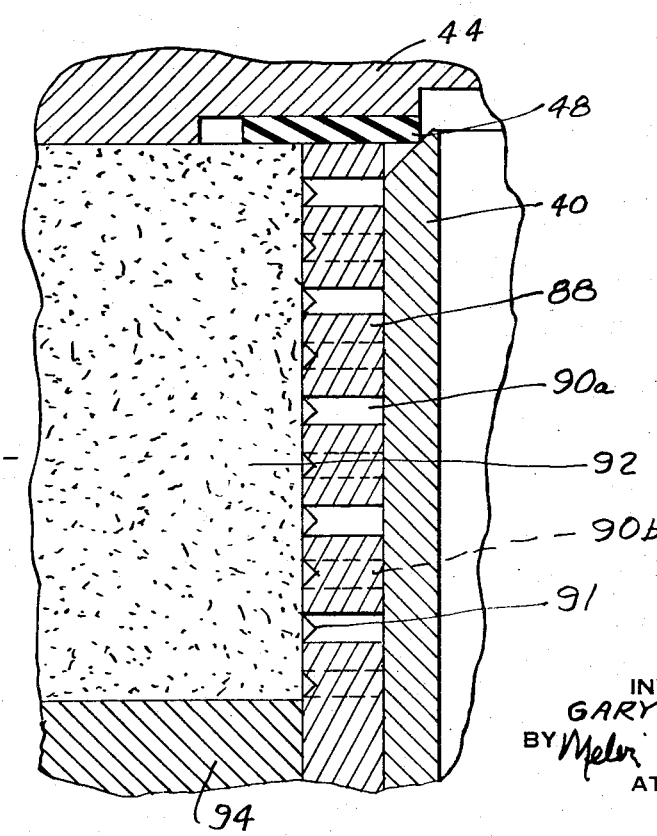
FIG-3-

SILENT OPERATING VALVE

BACKGROUND OF THE INVENTION

This invention relates to a silent valve, and more particularly, to a valve provided with means for greatly retarding the velocity of fluid flow through it when the valve is open.

Fluid flowing at high velocity, as through a valve may generate an objectionably high noise level. This may be particularly objectionable in certain installations, as for example, in gas systems on military craft such as a submarine. In addition, high velocity fluid flow through the valve is likely to cause erosion, particularly if vapor or oil droplets are entrained in the fluid stream.

OBJECTS OF THE INVENTION

It is an object of this invention to provide a valve which is capable of silent operation.

It is an object of this invention to provide a valve structure with means for greatly retarding the velocity of fluid flow therethrough.

It is a further object of this invention to provide a device for retarding fluid flow, which has progressively increasing flow capacity as the valve moves toward full open position.

Other objects and advantages of this invention will become apparent from the description to follow, particularly when read in conjunction with the accompanying drawing.

BRIEF SUMMARY OF THE INVENTION

In carrying out this invention, a central inlet flow port is closed by a tubular, axially operated valve closure plug engaging a seat around the port. A valve operating stem is moved in one direction to open the valve and a spring biases the valve into closed position. One or more outlet passage is located radially outward of the valve closure plug in spaced relationship thereto, and interposed between the plug and the outlet passage is an annular member of porous material. The plug is guided in a sleeve with a plurality of longitudinal rows of slots around it opening to the inner surface of the porous annular member. Grooves connect circumferentially aligned slots to distribute pressure circumferentially. As each slot is uncovered by the valve closure plug during opening movement, flow is directed through it and then through the porous member in radially outward directions.

BRIEF DESCRIPTION OF THE DRAWINGS

FIG. 2 is an isometric view of the guide sleeve for the regulator; and

FIG. 3 is an enlarged partial section view of a portion of the valve showing the guide sleeve and velocity retarding porous member.

DESCRIPTION OF A PREFERRED EMBODIMENT

Figure 1:
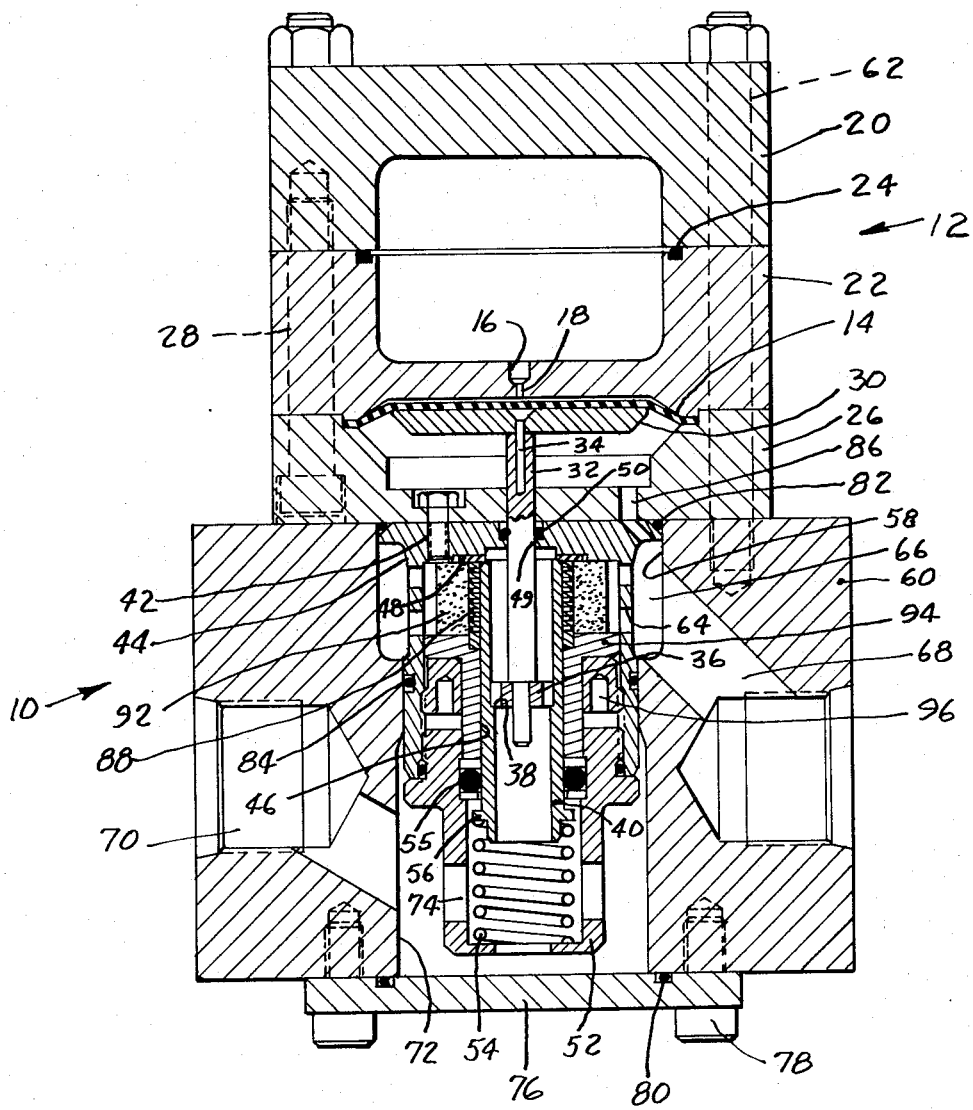
FIG. 1 is a vertical section view of a fluid pressure regulator incorporating features of this invention.

Referring now more particularly to FIG. 1, this invention may, by way of example, be incorporated into a pressure fluid regulator 10 having a dome loading chamber 12 the loading pressure of which is exposed to a diaphragm 14 by means of a loading passage 16 provided with an orifice 18. The dome 12 may be formed in two sections 20 and 22 with the joint between them sealed off, as by means of an 0-ring 24. A mounting plate 26 clamps the edges of the diaphragm 14 to the lower dome section 22, the diaphragm sealing between them. The two dome sections 20 and 22, and the mounting plate 26 are all secured together, as by means of cap screws 28.

A diaphragm back-up plate 30 supports the diaphragm and operates to depress a valve operating rod 32 through a sliding pin connection 34. The operating rod 32 transmits motion through a spider 36 carried on a shoulder 38 within the tubular valve closure plug 40.

Secured to the lower mounting plate 26 as by means of cap screws 42 is a sub-housing 44 having a central bore 46 for the tubular valve closure plug 40 around the upper end of which is mounted a valve seat 48, which is preferably of elastomeric or plastic material. A bore 49 at the upper end of the sub-housing 44 slidably receives the valve operating rod 32, with an 0-ring 50 sealing around the rod 32. A spring retainer sleeve 52 threadedly received in the lower end of the sub-housing 44 compresses a coil spring 54 against a radial flange 56 on the tubular closure plug 40 to bias it toward the seat 48. An 0-ring 55 seals between the closure plug 40 and spring retainer 52. The sub-housing 44 is received in a bore 58 in a main body block 60 and the whole assembly is secured in place by suitable bolts 62, which extend through the dome assembly 12. A series of outlet ports 64 open around the sub-housing into an annular outlet passage 66 formed by the bore 58 in the main body block 60. The outlet passage 66, in turn, opens into an outlet 68 in the main body block 60. Similarly, a body block inlet 70 opens into a bore 72 opening from the bottom of the body block. The inlet communicates with the interior of the tubular closure plug 40 through inlet ports 74 in the spring retainer sleeve 52. A plate 76 secured to the body block by cap screws 78 and sealed at 80, closes off the bore 72 at the bottom. Seal rings 82 around the top of the sub-housing 44 seal the outlet against leakage and an intermediate seal ring 84 isolates the inlet and outlet passage 70 and 68. A sensing port 86 opens through the mounting plate 26 to expose the underside of the diaphragm 14 to outlet pressure.

Referring now to FIGS. 2 and 3, a guide sleeve 88 embraces the tubular closure plug 40 whereby its finished inner surface guides the plug positively and prevents cocking thereof. The guide sleeve has a plurality of holes or slots 90a and 90b around it, preferably arranged in axial rows as shown. The slots 90a and the slots 90b are interconnected by grooves 91 for distribution of pressure around the circumference of the sleeve 88. The rows of holes or slots 90a and 90b are staggered to minimize the axial spacing of flow openings, providing finer increments of flow variation with movement of the valve plug 40, without unduly weakening the structure.

Surrounding the guide sleeve 88 is a porous annular member 92, the guide sleeve and porous member being mounted on a retainer sleeve 94 which, in turn, is held in place by a threaded sleeve 96. The annular porous member 92 may be made of a sintered metal, and preferably a sintered material of metal fibers, which provide multitudinous microscopic, tortuous flow paths. The cross section area of the porous member 92, i.e., the flow path increases progressively toward the radially outer portions thereof, to provide gradually increased flow capacity compensating for gas expansion. Because of the tendency of the fluid to flow along the shortest path, i.e., planar radial flow from inside to outside, fluid flowing from the slots 90a and 90b through the annular porous member 92, tends to remain in discreet, axially separated paths.

In operation, the tubular closure plug 50 is normally biased by the spring 54 into the closed position shown in FIG. 1. However, when the spring force is overcome by the pressure fluid, which is loaded into the dome 12 from a suitable source (not shown) the closure plug 40 is moved away from the seat 48 permitting a radially outward flow of fluid. As the closure plug moves toward full open position, it gradually uncovers more and more slots 90a and 90b in the guide sleeve 88 with the result that flow capacity is increased. In addition, the capacity of the radial flow paths are increased as the gas flows toward the outer circumference simply by reason of the larger cross section with increase in circumference. The multitudinous tortuous flow paths through the porous member greatly retard the flow of gas preventing high velocity flow and producing silent operation.

While this invention has been described in conjunction with a preferred embodiment thereof, it is obvious that modifications and changes therein may be made by those skilled in the art without departing from the spirit and scope of this invention.

What is claimed is:

1. In a valve structure comprising:
   a body having an inlet port,
   an axially movable valve closure member in said body, and
   an outlet passageway in said body radially outward of said closure member and in spaced relationship thereto,
   the improvement comprising:
   a rigid annular member of porous material in said body and embracing said valve closure member,
   a sleeve closely embracing said valve closure member snugly within said annular porous member, and
   a plurality of circumferential rows of through openings in said sleeve said rows being spaced apart along said sleeve to be uncovered progressively by said valve closure member during opening movement thereof providing a plurality of discreet, axially separated flow paths radially outward through said porous member.

2. The valve structure defined by claim 1 wherein:
   said porous member is formed of compacted metal fibers.

3. The valve structure defined by claim 1 wherein:
   said porous member is formed of sintered metal fibers.

4. The valve structure defined by claim 1 including:
   pressure distributing grooves around said sleeve interconnecting said through openings in a circumferential row thereof.

5. The valve structure defined by claim 1 wherein:
   certain of said circumferential rows of through openings are in staggered relationship to other circumferential rows thereof.

* * * * *